Aug. 4, 1964    D. R. CARLISLE    3,142,961
COMBUSTION CHAMBER FOR A GAS TURBINE ENGINE
Filed Jan. 21, 1963    2 Sheets-Sheet 1
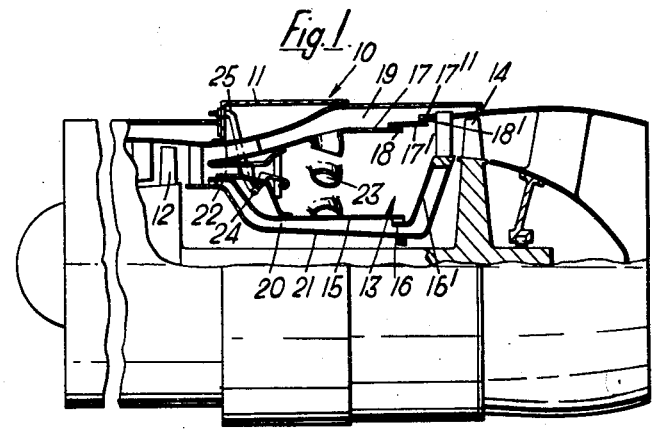
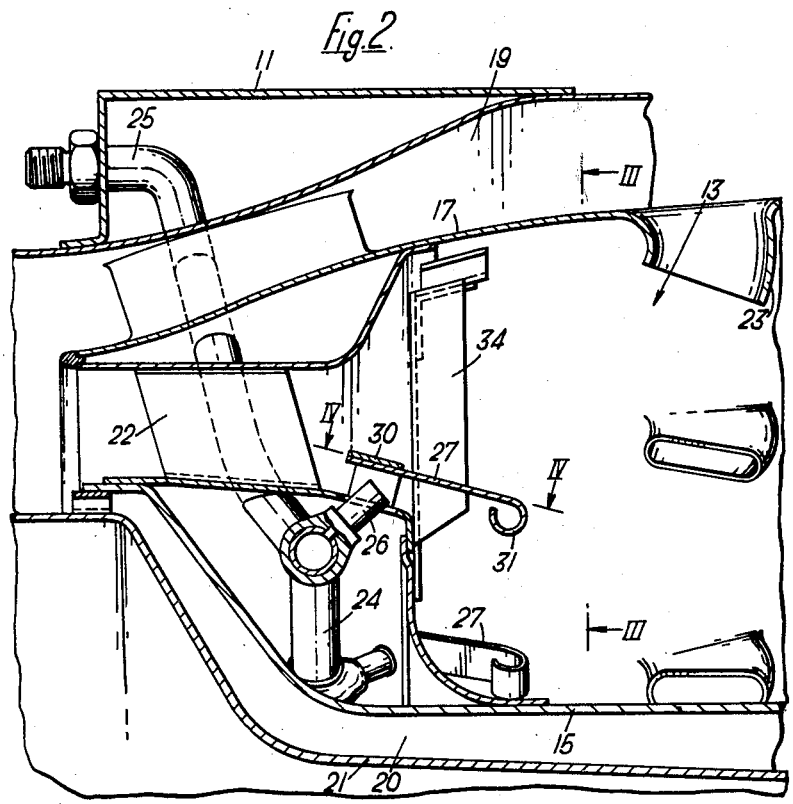
Inventor
Denis Richard Carlisle
By
Cushman, Darby & Cushman
Attorneys Aug. 4, 1964  D. R. CARLISLE  3,142,961
COMBUSTION CHAMBER FOR A GAS TURBINE ENGINE
Filed Jan. 21, 1963  2 Sheets-Sheet 2
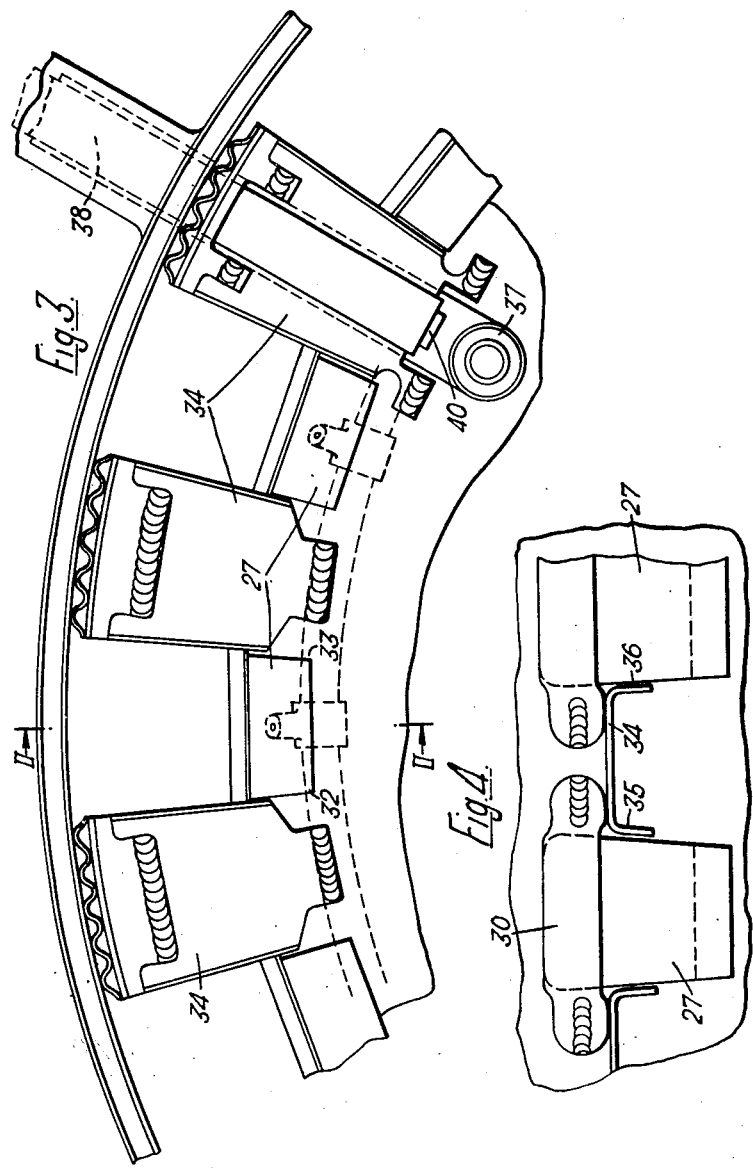
Inventor
Denis Richard Carlisle
By
Cushman, Darby & Cushman
Attorneys United States Patent Office 3,142,961
Patented Aug. 4, 1964

3,142,961
COMBUSTION CHAMBER FOR A GAS
TURBINE ENGINE
Denis Richard Carlisle, Risley, England, assignor to Rolls-Royce Limited, Derby, England, a company of Great Britain
Filed Jan. 21, 1963, Ser. No. 252,853
5 Claims. (Cl. 60—39.74)

This invention concerns a combustion chamber for a gas turbine engine.

According to the present invention, there is provided a combustion chamber for a gas turbine engine comprising a fuel injection nozzle disposed within said chamber, means for supplying the fuel injection nozzle with fuel, a fuel impingement member which is mounted within the combustion chamber to extend longitudinally thereof and which is so arranged that substantially all the fuel from the fuel injection nozzle is directed onto an upstream portion of the fuel impingement member, and means for directing past the fuel impingement member a stream of combustion air which urges the fuel to travel downstream along the fuel impingement member and which effects atomisation of the said fuel.

Preferably the fuel impingement member is a plate.

The said plate is preferably provided with means for reducing the velocity of the fuel passing over the plate.

The means for reducing the velocity of the fuel may comprise deflector means at the downstream end of the plate for deflecting the fuel so that the latter passes off the plate transversely thereof. Thus the downstream end of the plate may be bent back on itself to form a gutter for the fuel which constitutes the said deflector means, the said gutter extending transversely of the plate and being open at each of its opposite ends.

The said plate preferably slopes radially inwardly towards its downstream end.

The combustion chamber may be an annular combustion chamber which is provided with a plurality of the said fuel injection nozzles which are angularly spaced apart from each other, each fuel injection nozzle being provided with a said fuel impingement member. Preferably there are mounted in the annular combustion chamber an annular assembly of angularly spaced apart baffles, a fuel impingement member being mounted in the space between each adjacent pair of baffles, said baffles causing the combustion air to be directed past the fuel impingement members.

The combustion chamber is preferably provided with at least one auxiliary fuel atomising member, means for supplying the said member with fuel, and means for igniting the fuel atomised by the said member.

The combustion chamber may be such that the combustion gases undergo a single reversal of direction in the combustion zone of the combustion chamber.

A dilution air duct is preferably provided through which dilution air may be introduced into the combustion chamber, the dilution air duct being formed to diffuse the dilution air prior to its introduction into the combustion chamber.

The invention also comprises a gas turbine vertical lift engine provided with a combustion chamber as set forth above. The term "vertical lift engine," as used in this specification is to be understood to mean an engine which is adapted to produce vertical lift forces on an aircraft independently of those generated aerodynamically by forward flight.

Additionally the invention comprises an aircraft provided with at least one such gas turbine vertical lift engine.

The invention is illustrated, merely by way of example, in the accompanying drawings, in which:

FIGURE 1 is a view, partly in section, of a gas turbine vertical lift engine provided with a combustion chamber according to the present invention, FIGURES 2 and 3 are broken away sections showing parts of the combustion chamber of FIGURE 1 on a larger scale, the sections of FIGURES 2 and 3 being taken on the lines 2—2 of FIGURES 3 and 3—3 of FIGURE 2 respectively, and FIGURE 4 is a broken away plan view taken on the line 4—4 of FIGURE 2.

Referring to the drawings, a gas turbine vertical lift engine 10 for an aircraft comprises an engine casing 11 within which there are mounted in flow series a compressor 12, an annular combustion chamber 13, and a turbine 14.

The annular combustion chamber 13 has an inner wall which is formed of two parts 15, 15' which are telescopically mounted with the interposition therebetween of a corrugated annular strip member 16. The annular combustion chamber 13 is also provided with an outer wall which is formed of three parts 17, 17', 17" which are telescopically mounted with the interposition therebetween of corrugated annular strip members 18, 18' respectively.

A dilution air duct 19 is provided between the outer wall 17, 17', 17" and the engine casing 11, while an annular cooling air duct 20 is provided between the inner wall 15, 15' and an inner casing 21.

Some of the air which has been compressed by the compressor 12 enters the combustion chamber 13 by way of an annular primary, or combustion, air duct 22.

The remainder of the air compressed by the compressor 12 is supplied to the cooling air duct 20 and to the dilution air duct 19.

The dilution air passing through the dilution air duct 19 is diffused therein and enters the combustion chamber 13 through a ring of angularly spaced apart dilution air holes 23. The dilution air holes 23 are disposed downsteam of the combustion zone in the combustion chamber 13, the dilution air being employed to reduce the temperature of the products of combustion to a value acceptable to the turbine 14.

Some of the air from the dilution air duct 19 and from the cooling air duct 20 passes between the corrugations of the corrugated annular strip members 16, 18, 18' to effect film cooling of the walls 15', 17', 17" respectively.

Combustion chambers for gas turbine engines commonly employ "secondary" air which is introduced into the combustion chamber immediately downstream of the combustion zone to assist the combustion gases to undergo reversals of direction and to complete the combustion. In the combustion chamber 13, however, no secondary air is employed and the combustion gases undergo only a single reversal of direction in the said combustion zone.

Disposed between the combustion air duct 22 and the inner wall 15 is an annular manifold 24 which is adapted to be supplied with fuel by way of a pipe 25. The annular manifold 24 is arranged to supply fuel to a plurality of angularly spaced apart fuel injection nozzles 26 each of which extends into the downstream end of the combustion air duct 22.

Each fuel injection nozzle 26 has associated therewith and spaced therefrom one of a plurality of angularly spaced apart, substantially rectangular fuel impingement plates 27. Substantially all the fuel from each fuel injection nozzle 26 impinges on the upstream portion of the respective fuel impingement plate 27.

Each fuel impingement plate 27, whose upstream end is secured to the inner wall of the combustion air duct 22 by means of a strap 30, extends longitudinally of the combustion chamber and slopes radially inwardly towards its downstream end. The downstream end of each of the fuel impingement plates 27, which is disposed within the combustion chamber 13 immediately upstream of the combustion zone therein, is bent back on itself to form a gutter 31. The gutter 31 is provided for fuel which has travelled downstream along the fuel impingement plate 27, the gutter 31 extending transversely of the fuel impingement plate 27 and being open at each of its opposite ends 32, 33.

A ring of angularly spaced apart baffles 34 are mounted in the combustion chamber 13, a fuel impingement plate 27 being mounted in the space between each adjacent pair of baffles 34. Each baffle 34 is substantially rectangular and has side walls 35, 36.

The baffles 34 cause the combustion air passing through the combustion air duct 22 to be directed past the fuel impingement plates 27 in the form of a number of streams of combustion air which serve to urge the fuel, which has been directed onto the fuel impingement plates 27 from the fuel injection nozzles 26, to travel downstream along the plates 27.

Some of the fuel will be atomised while passing over the fuel impingement plates 27, the remaining fuel collecting in the gutters 31 and being atomised after passing out of the open ends 32, 33 of the gutters 31.

The gutters 31 of the fuel impingement plates 27 serve to reduce the velocity of the fuel passing over the said plates and to cause the fuel to become spread out transversely of the plate whereby the fuel is confined to the combustion zone and does not pass unburnt through the combustion chamber.

The combustion chamber 13 is also provided with two diametrically spaced apart auxiliary fuel atomising nozzles 37 (only one shown). Each nozzle 37 is supplied with fuel through a pipe 38. An high tension electrical igniter 40 is disposed adjacent each of the auxiliary fuel atomising nozzles 37 and is adapted to ignite the fuel atomised thereby.

The auxiliary fuel atomising nozzles 37 and the igniters 40 are used during starting of the engine but may be allowed to continue in operation even when the main fuel supply through the nozzles 26 is operative.

It will be appreciated that the provision of the fuel impingement plates 27 constitutes a cheap and simple device for effecting atomisation of the fuel and that this device is particularly useful in connection with vertical lift engines which are operated for short periods only.

I claim:

1. A combustion chamber for a gas turbine engine comprising a fuel injection nozzle disposed within said chamber, means for supplying the fuel injection nozzle with fuel, a plate which is mounted within the combustion chamber to extend longitudinally thereof, said plate sloping radially inwardly toward its downstream end, the upstream portion of the plate having substantially all the fuel from the fuel injection nozzle directed onto it, means for directing past the plate a stream of combustion air which urges the fuel to travel downstream along the plate and which effects atomisation of the said fuel, said last-mentioned means including a baffle positioned along each longitudinal edge of said plate and extending transversely of the plate, and deflector means at the downstream end of and forming part of the plate, said deflector means extending across the width of and terminating at the longitudinal edges of the plate for deflecting the fuel so that the latter passes off the plate transversely thereof.

2. A combustion chamber for a gas turbine engine comprising a fuel injection nozzle disposed within said chamber, means for supplying the fuel injection nozzle with fuel, a plate which is mounted within the combustion chamber to extend longitudinally thereof, the upstream portion of the plate having substantially all the fuel from the fuel injection nozzle directed onto it and means for directing past the plate a stream of combustion air which urges the fuel to travel downstream along the plate and which effects atomisation of the said fuel, the downstream end of the plate being bent back on itself to form a gutter for the fuel, which gutter extends transversely of the plate and is open at each of its opposite ends.

3. A combustion chamber as claimed in claim 2 in which said longitudinally extending plate slopes radially inwardly towards its downstream end.

4. A combustion chamber as claimed in claim 2 including at least one auxiliary fuel atomizing member, means for supplying said auxiliary fuel atomizing member with fuel and means for igniting the fuel atomized by said member.

5. An annular combustion chamber for a gas turbine engine comprising a plurality of circumferentially spaced injection nozzles disposed within the annular chamber, means for supplying said fuel injection nozzles with fuel, a plurality of plates circumferentially spaced from each other mounted within the combustion chamber and each extending longitudinally thereof, there being one plate for each of said fuel injection nozzles, each of said plates being positioned adjacent its respective fuel injection nozzle so that the upstream portion of the plate receives substantially all of the fuel from the fuel injection nozzle directed at it, an annular assembly of angularly spaced apart baffles mounted in said annular combustion chamber, each adjacent pair of said baffles having one of said plates mounted therebetween, said baffles directing a stream of combustion air past the plate to urge fuel to travel downstream along the plates which effect atomization of the fuel, and each of said plates being bent back on itself to form a gutter for the fuel, the gutter for each plate extending transversely of the plate and opened at each of its opposite ends so that fuel at the downstream ends of said plates is deflected and passes off each of the plates transversely thereof.

References Cited in the file of this patent

UNITED STATES PATENTS

| | | |
|---|---|---|
| 2,773,350 | Barrett et al. | Dec. 11, 1956 |
| 2,920,449 | Johnson et al. | Jan. 12, 1960 |
| 2,982,099 | Carlisle et al. | May 2, 1961 |